United States Patent
Weder

(10) Patent No.: US 6,468,196 B1
(45) Date of Patent: Oct. 22, 2002

(54) SYNTHETIC DECORATIVE GRASS SIMULATING SPANISH MOSS AND METHOD FOR MAKING SAME

(75) Inventor: Donald E. Weder, Highland, IL (US)

(73) Assignee: Southpac Trust International, Inc., Highland, IL (US)

( * ) Notice: Subject to any disclaimer, the term of this patent is extended or adjusted under 35 U.S.C. 154(b) by 0 days.

(21) Appl. No.: 09/847,831

(22) Filed: May 2, 2001

Related U.S. Application Data

(63) Continuation of application No. 09/338,249, filed on Jun. 22, 1999, now abandoned.
(60) Provisional application No. 60/092,150, filed on Jul. 9, 1998.

(51) Int. Cl.$^7$ ................................................ B31B 1/14
(52) U.S. Cl. ................... 493/459; 493/461; 493/352; 493/340; 156/60; 156/61; 83/56
(58) Field of Search ................... 428/537.5, 17, 428/220; 493/459, 461, 340, 352; 156/60, 61; 83/56

(56) References Cited

U.S. PATENT DOCUMENTS

| | | |
|---|---|---|
| 2,615,614 A | 10/1952 | Linda |
| 2,679,887 A | 6/1954 | Doyle et al. |
| 2,971,292 A | 2/1961 | Malecki |
| 3,663,267 A | 5/1972 | Moran et al. ............... 117/76 P |
| 3,983,202 A | 9/1976 | Skoroszewski ............ 264/147 |
| 4,067,716 A | 1/1978 | Sterrett ........................ 71/24 |
| 4,214,909 A | 7/1980 | Mawatari et al. ............ 106/16 |
| 4,268,994 A | 5/1981 | Urai ............................. 47/79 |
| 4,282,340 A | 8/1981 | Anchor et al. ............... 526/93 |
| 4,361,982 A | 12/1982 | Horowitz ..................... 47/45 |
| 4,386,480 A | 6/1983 | Horowitz ..................... 47/45 |
| 4,443,969 A | 4/1984 | Hanacek et al. ............. 47/1.1 |
| 4,500,315 A | 2/1985 | Pieniak et al. .............. 604/379 |
| 4,537,590 A | 8/1985 | Pieniak et al. .............. 604/379 |
| 4,544,585 A | 10/1985 | Brenner ........................ 428/17 |
| 4,573,988 A | 3/1986 | Pieniak et al. .............. 604/379 |
| 4,578,070 A | 3/1986 | Holtman ..................... 604/378 |
| 4,822,622 A | 4/1989 | Dokuzovic et al. ............. 426/5 |
| 4,891,251 A | 1/1990 | Fletcher ......................... 428/7 |
| 4,941,282 A | 7/1990 | Milstein ........................ 47/58 |
| 4,992,324 A | 2/1991 | Dubé ........................... 428/226 |
| 5,018,300 A | 5/1991 | Chiu et al. ..................... 47/67 |
| 5,053,029 A | 10/1991 | Yang ........................... 604/385 |
| 5,088,972 A | 2/1992 | Parker ......................... 493/352 |
| 5,127,187 A | 7/1992 | Hattori et al. ................. 47/59 |
| 5,134,013 A | 7/1992 | Parker ......................... 428/182 |
| 5,173,352 A | 12/1992 | Parker ......................... 428/174 |
| 5,301,466 A | 4/1994 | Egan ............................. 47/58 |
| 5,403,259 A | 4/1995 | Parker ......................... 493/352 |
| 5,434,011 A | 7/1995 | Roy ............................. 428/532 |
| 5,441,877 A | 8/1995 | Chiaffredo et al. ........... 435/176 |
| 5,476,459 A | 12/1995 | Yang ......................... 604/385.1 |
| D368,654 S | 4/1996 | Santoiemmo et al. ........ D9/415 |
| 5,514,191 A | 5/1996 | Miller et al. .................. 47/1.1 |
| 5,547,413 A * | 8/1996 | Murray |
| 5,573,491 A | 11/1996 | Parker ......................... 493/352 |
| 5,631,057 A | 5/1997 | Sundet ......................... 428/60 |
| 5,656,008 A | 8/1997 | Beierlorzer ................. 493/346 |
| 5,711,752 A * | 1/1998 | Goldstein |
| 5,712,020 A | 1/1998 | Parker ......................... 428/182 |
| 5,871,432 A | 2/1999 | Beierlorzer ................. 493/352 |
| 5,906,569 A | 5/1999 | Ratzel ......................... 493/363 |
| 5,921,907 A | 7/1999 | Beierlorzer ................. 493/357 |

FOREIGN PATENT DOCUMENTS

| | | |
|---|---|---|
| WO | WO9916615 | 4/1999 |

* cited by examiner

*Primary Examiner*—Deborah Jones
*Assistant Examiner*—Wendy Boss
(74) *Attorney, Agent, or Firm*—Dunlap, Codding & Rogers, P.C.

(57) ABSTRACT

Curled decorative grasses and methods for producing same are disclosed wherein the curled decorative grasses have improved bulk and simulate Spanish moss in color and appearance.

4 Claims, 3 Drawing Sheets

SYNTHETIC DECORATIVE GRASS SIMULATING SPANISH MOSS AND METHOD FOR MAKING SAME

CROSS REFERENCE TO RELATED APPLICATIONS

This application is a continuation of U.S. Ser. No. 09/338,249, filed Jun. 22, 1999 now abandonded entitled "SYNTHETIC DECORATIVE GRASS SIMULATING SPANISH MOSS AND METHOD FOR MAKING SAME" now abandoned; which claims benefit of provisional application U.S. Serial No. 60/092,150, filed Jul. 9, 1998, entitled "SYNTHETIC DECORATIVE GRASS ASSIMILATING SPANISH MOSS AND METHOD FOR MAKING SAME."

STATEMENT REGARDING FEDERALLY SPONSORED RESEARCH OR DEVELOPMENT

Not Applicable.

BACKGROUND OF THE INVENTION

1. Field of the Invention

The present invention relates generally to decorative grass and methods for producing same, and more particularly, but not by way of limitation, to curled, intertwined decorative grass simulating Spanish moss and methods for producing same.

2. Brief Description of Prior Art

Spanish moss is an epiphytic of the pineapple family which forms pendent tufts of grayish green filaments on trees from the southern United States of America to Argentina. Spanish moss, when dried has heretofore been used as decorative material as well as a packing material. However, Spanish moss is expensive and Spanish moss often contains undesirable amounts of chaff and dust.

Synthetic decorative grass has been used for many years in Easter baskets and for other decorative purposes. The synthetic decorative grass of the prior art has been produced by numerous methods and from a variety of materials such as polymeric materials, paper, cellophane or the like. Typically, such materials are cut and shredded to produce segments having predetermined dimensions. One such prior art method for making decorative grass is disclosed in U.S. Pat. No. 4,292,266, issued to Weder, et al., wherein a plastic film is extruded and cut into plastic strips which are passed through a slow-speed godet, an oven and a high-speed godet so that the strips are drawn down in width and thickness without breaking. From the high-speed godet, the strips or strands are chopped to a desired length and conveyed to a storage area for subsequent bagging and packaging.

While the prior art methods for making decorative grass have been widely accepted, new and improved methods for making decorative grasses having improved bulk and aesthetic qualities, such as simulating the appearance of Spanish moss, are being sought which are less costly. It is to such decorative grasses and methods for producing same that the present invention is directed.

SUMMARY OF THE INVENTION

The present invention relates to curled, intertwined decorative grasses having improved bulk and which simulate the appearance of Spanish moss. In one aspect, the present invention relates to methods for making decorative grasses which simulate, in appearance and color, Spanish moss. Because of the reduced amount of chaff and dust present in the curled decorative grasses simulating the appearance of Spanish moss made in accordance with the present invention, as well as the increased bulk of such curled decorative grasses, such decorative grasses can be used as decorative materials, as a filler for Easter baskets, i.e. Easter grass, as well as for animal bedding, cat litter, mulch for soil and media for plants.

The curled decorative grasses having improved bulk and which simulate the appearance of Spanish moss are produced by imparting a curl to a web or sheet of material having a color simulating the color of Spanish moss (i.e. grayish green) and thereafter cutting the curled web or sheet of material into stands of material which are intertwined and simulate Spanish moss in appearance.

The web or sheet of material can be formed of any material capable of being curled and dyed to a color simulating the color of spanish moss. Examples of materials which can be used as the web or sheet of material in the production of curled, intertwined decorative grasses which simulate Spanish moss in appearance are paper and laminates, such as laminates made of at least two polymeric films, or laminates made of polymeric film and paper, or laminates made of metal foil and a polymeric film or paper.

An object of the present invention is to provide curled decorative grasses which simulate the appearance of Spanish moss.

Another object of the present invention, while achieving the before-stated object, is to provide curled decorative grasses which simulate the appearance of Spanish moss and which have improved bulk.

Yet another object of the present invention, while achieving the before-stated objects, is to provide methods for producing curled decorative grasses simulating the appearance of Spanish moss which are cost effective.

Other objects, features and advantages of the present invention will become apparent from the following detailed description when read in conjunction with the accompanying drawings and appended claims.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DESCRIPTION OF THE PREFERRED EMBODIMENTS

Figure 1:
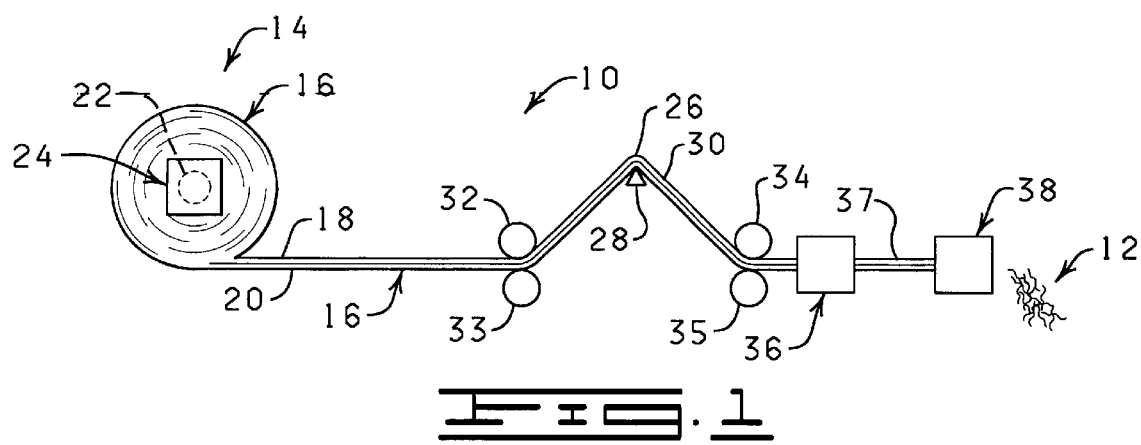
FIG. 1 is a schematic representation of a system for making a curled decorative grass simulating Spanish moss from a laminated web of material in accordance with the present invention.

Referring now to the drawings, FIG. 1 illustrates schematically a system 10 for making curled decorative grass 12 simulating Spanish moss in accordance with the present invention. That is, the curled decorative grass 12 has an intertwined configuration and a color (i.e. grayish green) which provides the curled, intertwined decorative grass with an appearance simulating Spanish moss (see FIG. 6). Thus, the curled decorative grass 12 is especially suited for use as a decorating material in place of Spanish moss, and as a decorative grass in Easter baskets, or as packing material, animal bedding, cat litter, mulch for soil and media for plants.

The system 10 includes a roll of material 14 which consists of a substantially flat web of laminated material 16 capable of having a curl imparted thereto. The laminated material 16, which is dyed or colored to have a grayish green color substantially corresponding to the color of Spanish moss, can be formed by laminating a first web of material 18 to a second web of material 20 by any method known in the art.

Any ink or dye capable of imparting the desired grayish green color to the laminated material 16 or the first and/or second webs of material 18 and 20 so that the laminated material 16 is provided with a grayish green color simulating the color of Spanish moss can be employed as the dye or ink in the practice of the present invention. Such inks and dyes are commercially available and well known in the art. An example of an ink which may be applied to the laminated material 16 or the first and/or second webs of material 18 and 20 so that the laminated material 16 is provided with a grayish green color simulating the color of Spanish moss is described in U.S. Pat. No. 5,147,706 entitled "Water Based Ink On Foil And/Or Synthetic Organic Polymer" issued to Kingman on Sep. 15, 1992 and which is hereby incorporated herein by reference. In addition, if a bonding material is used to laminate the first and second webs of material 18 and 20 together, the bonding material may also be tinted or colored by using a dye, pigment, or ink having a grayish green color simulating the color of Spanish moss.

The roll of material 14 is supported on a mandrel 22 having a brake assembly 24 operably connected thereto so that the web of laminated material 16 can be controllably withdrawn from the roll of material 12. The web of laminated material 16 withdrawn from the roll of material 12 is drawn over a curling edge 26 of a curl bar 28 so as to provide a curled web of laminated material 30.

The curling edge 26 of the curl bar 28 is angularly disposed relative to the travel path of the web of laminated material 16 so that as the web of laminated material 16 is drawn over the curling edge 26 of the curl bar 28, the curled web of laminated material 30 is produced. The angular disposition of the curling edge 26 of the curl bar 28 relative to the web of laminated material 16 can vary widely and will be dependent to a large degree on the amount and type of curl to be imparted to the web of laminated material 16, as well as to the curling properties of the first and second webs of material 18 and 20 or the web of laminated material 16. Generally, however, the curling edge 26 of the curl bar 28 will be disposed at an angle of from about 15 degrees to about 180 degrees relative to the direction of travel of the web of laminated material 16.

To maintain the desired tension on the web of laminated material 16 as the web of laminated material 16 is drawn over the curling edge 26 of the curl bar 28, the system 10 may further include a pair of tension or nip rollers 32 and 33 positioned upstream of the curl bar 26 and a pair of tension or nip rollers 34 and 35 positioned downstream of the curl bar 28 to ensure proper tension on the web of laminated material 16, as well as angular disposition of the web of material laminated 16, as the web of laminated material 16 is drawn over the curling edge 26 of the curl bar 28. The curled web of laminated material 30, upon passage through the tension rollers 32 and 34, is fed into a slitter or shredder unit 36 where the curled web of laminated material 30 is slit to provide a slit web of curled laminated material 37 having a plurality of curled strips of predetermined width.

The slitting of the curled web of laminated material 30 to produce the slit web of curled laminated material 37 having a plurality of curled strips of predetermined width can be accomplished using any well known method and device. Such common methods of slitting the curled web of laminated material 30 include: (a) slitting the curled web of laminated material 30 to produce side-by-side strips of material wherein the longer dimension of the strips is in the direction of travel of the curled web of laminated material 30, i.e. the machine direction; or (b) slitting the curled web of laminated material 30 so that the longer dimension of the strips of material are oblique to the direction of travel of the curled web of laminated material 30, i.e. obliquely to the machine direction.

The slit web of curled laminated material 37 is then passed through a cutting unit 38 where the curled strips of the slit web of curled laminated material 37 are cut into segments to form the curled decorative grass 12 which, in cluster form, simulates Spanish moss in appearance.

Any conventional device and method can be employed as the slitter or shredder unit 36 for slitting of the curled web of laminated material 30 to produce the slit web of curled laminated material 37 and for cutting the curled strips of the slit web of curled laminated material 37 to form the curled decorative grass 12 simulating Spanish moss. Examples of conventional devices which can be used as the slitter or shredder unit 36 and/or as the cutting unit 38 are rotary knives, reciprocating knives, die cutting, laser cutting, water jet cutting, air jet cutting and the like.

The curled decorative grass 12 simulating Spanish moss produced by cutting the slit web of curled laminated material 37 can then be conveyed to a storage area (not shown) which may be in the form of a suitable bin, or the curled decorative grass 12 simulating Spanish moss may be conveyed to a packaging machine, or the curled decorative grass 12 simulating Spanish moss may be conveyed to a baling machine for baling prior to storage. As other alternatives, the curled decorative grass 12 simulating Spanish moss may be placed into boxes or cartons, subjected to further processing immediately or held for subsequent processing.

Any material capable of having a curl imparted thereto and which can be dyed or colored can be employed as the first web of material 18 and second web of material 20. However, desirable results can be achieved wherein the first web of material 18 is paper and the second web of material 20 is a polymeric film; or wherein the first and second webs of material 18 and 20 are each made of a polymeric film, or wherein the first web of material 18 is a polymeric film or paper and the second web of material 20 is a metal foil.

The first web of material 18 and the second web of material 20 can be constructed of any material capable of having a curl imparted thereto so that the laminated web of material 16 produced by lamination of the first and second webs 18 and 20 is capable of having a curl imparted thereto. The first web of material 18 can be constructed of either a transparent polymeric material which permits the color of the second web of material 20 to be viewed through the first web of material 18, or a polymeric material which can be dyed or colored so that the laminated web of material 16 simulates the color of Spanish moss, or paper; and the second web of material 20 can be constructed of a polymeric material or metal foil which can be dyed or colored so that the laminated web of material 16 simulates the color of Spanish moss.

The first web of material 18 will generally have a thickness in a range from about 0.1 mils to about 10 mils, and more desirably in a range of from about 0.4 mils to about 0.9 mils; and the second web of material 20 will generally have a thickness in a range from about 0.1 mils to about 10 mils, and more desirably in a range of from about 0.4 mils to about 0.9 mils. Further, the first and/or second webs of material 18 and 20 may be constructed of a single layer of material or a laminated material containing a plurality of layers of the same or different types of materials as long as the web of laminated material 16 can have the desired curl imparted to it.

Figure 2:
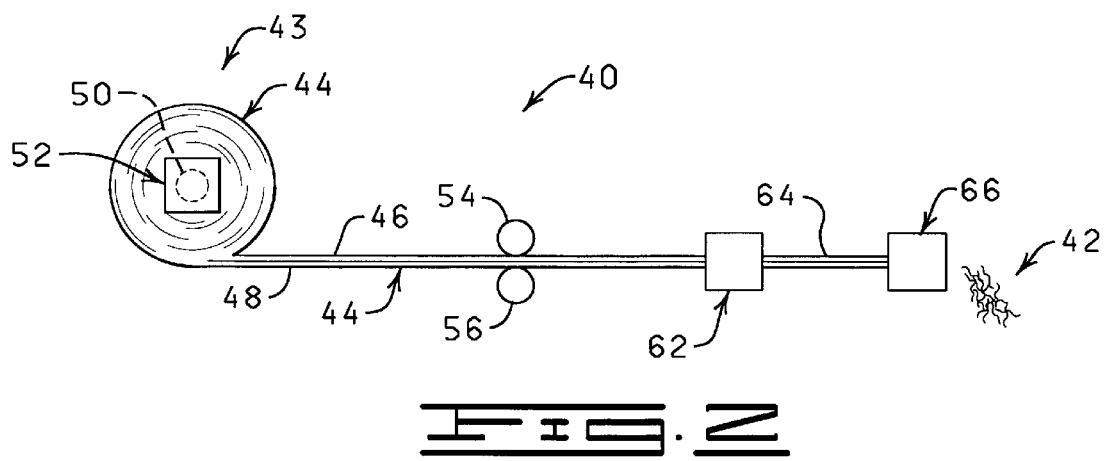
FIG. 2 is a schematic representation of another system for making a curled decorative grass simulating Spanish moss from a laminated web of material in accordance with the present invention.

FIG. 2 illustrates schematically another system 40 for making a curled decorative grass 42 simulating Spanish moss from a roll of material 43 which consists of a substantially flat web of laminated material 44 which has a preset curl formed therein. The laminated material 44 is dyed or colored to have a grayish color substantially corresponding to the color of Spanish moss. The web of laminated material 44 (only a segment being shown in FIG. 3) is provided with a preset curl formed during lamination of a first web of material 46 to a second web of material 48 to produce the web of laminated material 44.

Figure 3:
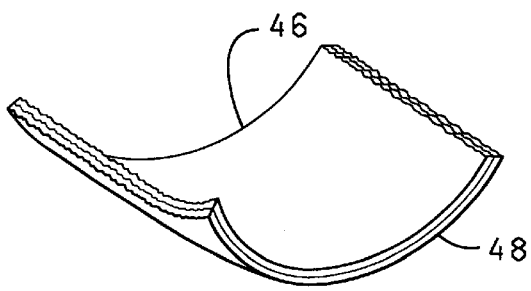
FIG. 3 is a perspective view of a first web of material and a second web of material employed to produce the laminated web of material of FIG. 2, the first web of material being shorter in length than the second web of material.
Figure 4:
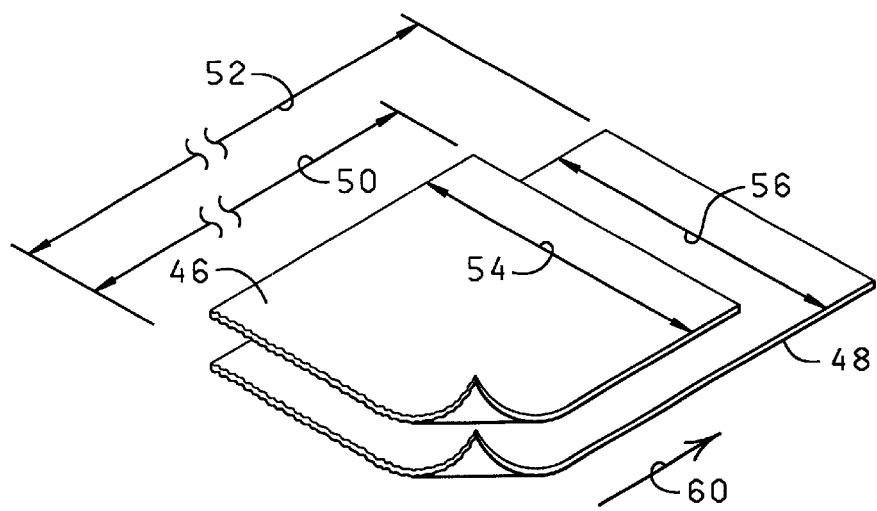
FIG. 4 is a perspective view of the first and second webs of material of FIG. 3 wherein the first web of material is stretched prior to laminating the first and second webs of material so that a curl is imparted to the laminated web of material.

Referring now to FIG. 4 in combination with FIGS. 2 and 3, the preset curl is provided in the web of laminated material 44 by stretching at least one of the webs of material, such as the first web of material 46, and maintaining the first web of material 46 in a stretched condition during lamination of the first web of material 46 to the second web of material 48. That is, as depicted in FIG. 4, the first web of material 46 is provided with a length 50 which is less than a length 52 of the second web of material 48. It should be understood, however, that the first web of material 46 could be provided with a width 54 which is different than a width 56 of the second web of material 48; or the length 50 and the width 54 of the first web of material 46 could be of a different dimension than the length 52 and the width 56 of the second web of material 48.

As shown in FIG. 4, the first web of material 46 is disposed adjacent the second web of material 48. The first web of material 46 is then stretched in direction 60 (FIG. 4) a predetermined amount required to produce the desired curl in the web of laminated material 44 when the stretch first web of material 46 is laminated to the second web of material 48.

With the first web of material 46 in the stretched condition and substantially aligned with the second web of material 48, the first and second webs of material 46 and 48 are then laminated together by any method known in the art. By laminating the first web of material 46 to the second web of material 48 while the first web of material 46 is in the stretched condition, the first web of material 46 creates a recoil tension wherein the first web of material 46 tends to return to its original length which results in a preset curl being formed in the web of laminated material 44 substantially as shown in FIG. 3.

Any ink or dye capable of imparting the desired grayish green color to the web of laminated material 44 or the first and/or second webs of material 46 and 48 so that the web of laminated material 44 is provided with a grayish green color simulating the color of Spanish moss can be employed as the dye or ink in the practice of the present invention. Such inks and dyes are commercially available and well known in the art. An example of an ink which may be applied to the surface of the web of laminated material 44 or the first and/or second webs of material 46 and 48 so that the web of laminated material 16 is provided with a grayish color simulating the color of Spanish moss is described in U.S. Pat. No. 5,147,706 entitled "Water Based Ink On Foil And/Or Synthetic Organic Polymer" issued to Kingman on Sep. 15, 1992 and which is hereby incorporated herein by reference. In addition, the bonding material used to laminate the first and second webs of material 46 and 48 together may also be tinted or colored by using a dye, pigment, or ink having a grayish green color simulating the color of Spanish moss.

The first web of material 46 can be constructed of any material which can be stretch and laminated to the second web of material 48 so as to impart a curl to the laminated web of material 44. Further, the first web of material 44 is constructed of either a transparent polymeric material which permits the color of the second web of material 48 to be viewed through the first web of material 44, or a material which can be dyed or colored so that the laminated web of material 44 simulates the color of Spanish moss. However, desirable results can be achieved wherein the first web of material 46 is a polymeric film and the second web of material 48 is paper; or wherein the first and second webs of material 46 and 48 are each made of a polymeric film; or where the first web of material 46 is a polymeric film and the second web of material 48 is a metal foil.

The first web of material 46 will generally have a thickness in a range from about 0.1 mils to about 10 mils, and more desirably in a range of from about 0.4 mils to about 0.9 mils; and the second web of material 48 will generally have a thickness in a range from about 0.1 mils to about 10 mils, and more desirably in a range of from about 0.4 mils to about 0.9 mils. Further, the first and/or second webs of material 46 and 48 may be constructed of a single layer of material or a laminated material containing a plurality of layers of the same or different types of materials as long as the web of laminated material 44 is provided with a preset curl.

Referring again to FIG. 2, the roll of material 43 is supported on a mandrel 50 having a brake assembly 52 operably connected thereto so that the web of laminated material 44 having a preset curl can be controllably withdrawn from the roll of material 43. The web of laminated material 44 having a preset curl is passed through a pair of tension or nip rollers 54 and 56 and into a slitter or shredder unit 62 where the web of laminated material 44 having a preset curl is slit to provide a slit web of curled laminated material 64 having a plurality of curled strips of predetermined width. The slitting of the web of laminated material 44 having a preset curl to produce the slit web of curled laminated material 64 having a plurality of curled strips of predetermined width can be accomplished using any well known method and device. Such common methods of slitting the web of laminated material 44 having a preset curl include: (a) slitting the web of laminated material 44 having a preset curl to produce side-by-side strips of material wherein the longer dimension of the strips is in the direction of travel of the web of laminated material 44 having a preset curl, i.e. the machine direction; or (b) slitting the web of laminated material 44 having a preset curl so that the longer dimension of the strips of material are oblique to the direction of travel of the web of laminated material 44 having a preset curl, i.e. obliquely to the machine direction.

The slit web of curled laminated material 64 is then passed through a cutting unit 66 where the curled strips of the slit web of curled laminated material 64 are cut into segments to form the curled decorative grass 42 simulating Spanish moss.

Any conventional device and method can be employed as the slitter or shredder unit 62 for slitting of the web of laminated material 44 having a preset curl to produce the curled strips of the slit web of curled laminated material 64 and for cutting the curled strips of the slit web of curled laminated material 64 to form the curled decorative grass 42 simulating Spanish moss. Examples of conventional devices which can be used as the slitter or shredder unit 62 and/or as the cutting unit 66 are rotary knives, reciprocating knives, die cutting, laser cutting, water jet cutting, air jet cutting and the like. Examples of such conventional devices and methods which can be employed to cut the slit web of curled laminated material 64 are rotary knives, reciprocating knives, die cutting, laser cutting, water jet cutting, air jet cutting and the like.

The curled decorative grass 42 simulating Spanish moss produced by cutting the slit web of curled laminated material 64 can then be conveyed to a storage area (not shown) which may be in the form of a suitable bin, or the curled decorative grass 42 simulating Spanish moss may be conveyed to a packaging machine, or the curled decorative grass 42 simulating Spanish moss may be conveyed to a baling machine for baling prior to storage. As other alternatives, the curled decorative grass 42 simulating Spanish moss may be placed into boxes or cartons, subjected to further processing immediately or held for subsequent processing.

Figure 5:
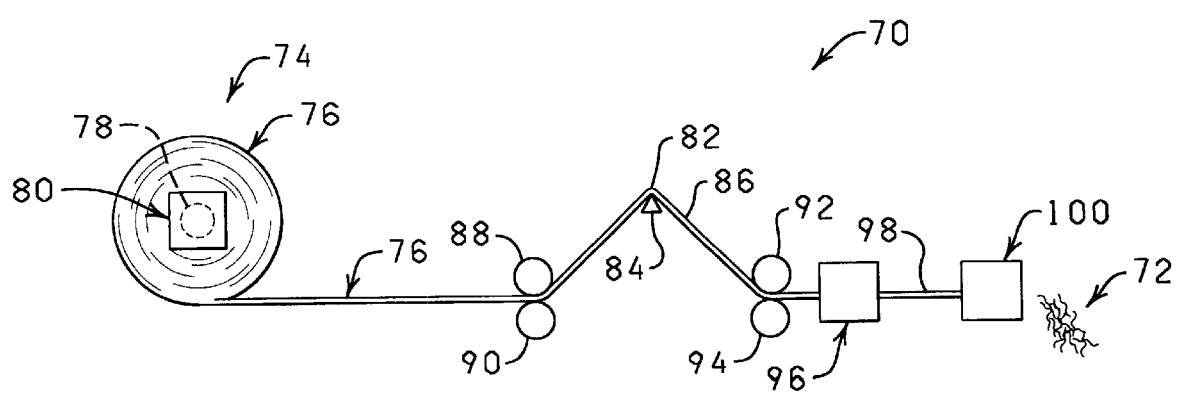
FIG. 5 is a schematic representation of a system for making a curled decorative grass simulating Spanish moss from a web of paper in accordance with the present invention.

FIG. 5 illustrates schematically another system 70 for making a curled decorative grass 72 simulating Spanish moss from a roll of material 74 which consists of a substantially flat web of paper, polymeric film, or metal foil 76 capable of having a curl set therein. The paper can include additives, such as shape-sustaining agents, water-proofing agents, anti-static agents and the like as long as the paper containing such agents can be curled and used to produce the curled decorative grass 72 which is intertwined and simulates Spanish moss in appearance. Similarly, the polymeric film can be any commercially available polymeric film which can be curled and used to produce the curled decorative grass 72 which is intertwined and simulates Spanish moss in appearance. An example of a commercially available polymeric film which, when dyed to the desired grayish green color simulating the color of Spanish moss, can be used to produce the curled decorative grass 72 is Vifan BT medium slip biaxially oriented polypropylene film which is available from Vifan Canada, Inc., Vifan street, Lanoraie d'Autray, Quebec, Canada JOK 1EO, Another example of a commercially available polymeric film which, when dyed to the desired grayish green color simulating the color of Spanish moss, can be used to produce the curled decorative grass 72 is Hercules B523 oriented polypropylene packaging film which is available from Hercules Incorporated, Hercules Plaza, Wilmington, Del. 19894.

The paper, polymeric material, or metal foil is dyed or colored to have a grayish green color substantially corresponding to the color of Spanish moss. Any ink or dye capable of imparting the desired grayish green color simulating the color of Spanish moss can be employed as the dye or ink for the paper, polymeric film or metal foil. Such inks and dyes are commercially available and well known in the art. An example of an ink which may be applied to the paper or polymeric film or metal foil so that the web of material 76 is provided with a grayish green color simulating the color of Spanish moss is described in U.S. Pat. No. 5,147,706 entitled "Water Based Ink On Foil And/Or Synthetic Organic Polymer" issued to Kingman on Sep. 15, 1992, and which is hereby incorporated herein by reference.

The thickness of the web of material 76 employed to produce the curled decorative grass 72 simulating the appearance of Spanish moss can vary widely. Generally however, the web of material 76 will have a thickness in the range of from about 0.1 mil to about 30 mils, and more desirably from about 0.1 mil to about 10 mils.

The roll of material 74 is supported on a mandrel 78 having a brake assembly 80 operably connected thereto so that the web of material 76 can be controllably withdrawn from the roll of material 74. The web of material 76 withdrawn from the roll of material 74 is drawn over a curling edge 82 of a curl bar 84 so as to provide a curled web of material 86.

The curling edge 82 of the curl bar 84 is angularly disposed relative to the travel path of the web of material 76 so that as the web of material 76 is drawn over the curling edge 82 of the curl bar 84, the curled web of material 86 is produced. The angular disposition of the curling edge 82 of the curl bar 84 relative to the direction of travel of the web of material 76 over the curling edge 82 of the curl bar 84 can vary widely and will be dependent to a large degree on the amount and type of curl to be imparted to the web of material 76, as well as to the curling properties of the web of material 76. Generally, however, the curling edge 82 of the curl bar 84 will be disposed at an angle of from about 15 degrees to about 180 degrees relative to the direction of travel of the web of material 76.

To maintain the desired tension on the web of material 76 as the web of material 76 is drawn over the curling edge 82 of the curl bar 84, the system 70 may further include a pair of tension or nip rollers 88 and 90 positioned upstream of the curl bar 84 and a pair of tension or nip rollers 92 and 94 positioned downstream of the curl bar 84 to ensure proper tension on the web of material 76, as well as angular disposition of the web of material 76, as the web of material 76 is drawn over the curling edge 82 of the curl bar 84. The curled web of material 86, upon passage through the tension rollers 92 and 94, is fed into a slitter or shredder unit 96 where the curled web of material 86 is slit to provide a slit web of curled material 98 having a plurality of curled strips of predetermined width.

The slitting of the curled web of material 86 to produce the slit web of curled material 98 having a plurality of curled strips of predetermined width can be accomplished using any well known method and device. Such common methods of slitting the curled web of material 86 include: (a) slitting the curled web of material 86 to produce side-by-side strips of material wherein the longer dimension of the strips is in the direction of travel of the curled web of material 86, i.e. the machine direction; or (b) slitting the curled web of material 86 so that the longer dimension of the strips of material are oblique to the direction of travel of the curled web of material 86, i.e. obliquely to the machine direction.

The slit web of curled material 98 is then passed through a cutting unit 100 where the curled strips of the slit web of curled material 98 are cut into segments to form the curled decorative grass 72 which, in cluster form, simulates Spanish moss.

Any conventional device and method can be employed as the slitter or shredder unit 96 for slitting of the curled web of paper or polymeric film 86 to produce the slit web of curled paper or polymeric film 98 and for cutting the curled strips of the slit web of curled paper or polymeric film 98 to form the curled decorative grass 72 assimilating Spanish moss. Examples of conventional devices which can be used as the slitter or shredder unit 96 and/or as the cutting unit 100 are rotary knives, reciprocating knives, die cutting, laser cutting, water jet cutting, air jet cutting and the like.

The curled decorative grass 72 assimilating Spanish moss produced by cutting the slit web of curled paper or polymeric film 98 can then be conveyed to a storage area (not shown) which may be in the form of a suitable bin, or the curled decorative grass 72 assimilating Spanish moss may be conveyed to a packaging machine, or the curled decorative grass 72 assimilating Spanish moss may be conveyed to a baling machine for baling prior to storage. As other alternatives, the curled decorative grass 72 assimilating Spanish moss may be placed into boxes or cartons, subjected to further processing immediately or held for subsequent processing.

Figure 6:
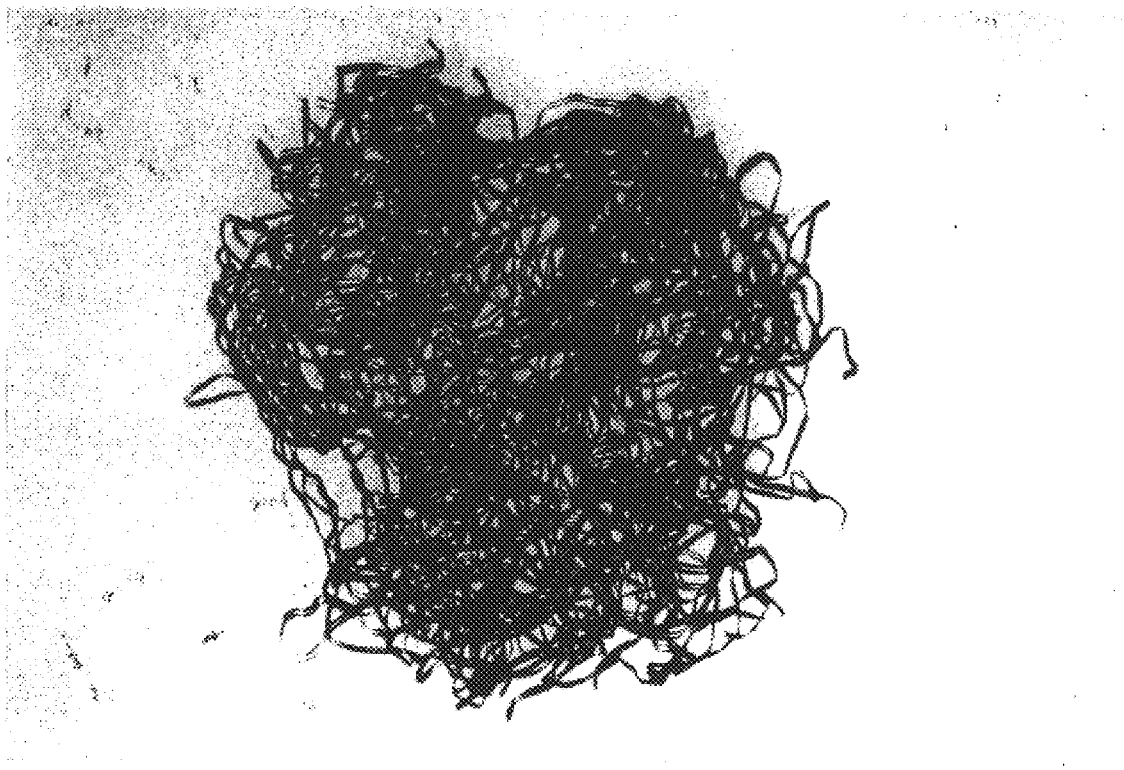
FIG. 6 is a pictorial representation of curled decorative grass simulating Spanish moss prepared in accordance with the present invention.

FIG. 6 is a pictorial representation of the curled decorative grasses 12, 42 and 72 assimilating Spanish moss prepared in accordance with the systems 10, 40 and 70 hereinbefore described with reference to FIGS. 1, 2 and 5.

Changes may be made in the embodiments of the invention described herein, or in parts or elements of the embodiments described herein, or in the steps or sequence of steps of the methods described herein, without departing from the spirit and/or scope of the invention as defined in the following claims.

What is claimed is:

1. A method for forming decorative grass simulating Spanish moss in appearance, comprising:

providing a web of laminated material having a color substantially corresponding with the color of Spanish moss and capable of having a curl imparted thereto;

contacting the web of laminated material with a surface capable of providing a curl in the web of laminated material and applying sufficient pressure to the laminated material to set the curl in the laminated material wherein the laminated material comprises a first web of material having a thickness in a range from about 0.1 mil to about 10 mil and a second web of material having a thickness in a range of from about 0.1 mil to about 10 mil and wherein the first web of material is formed of a polymeric film and the second web of material is formed of paper; and slitting the web of laminated material having a curl set therein and a color corresponding with the color of Spanish moss to provide a slit web of curled laminated material having a plurality of strips of a predetermined width and thereafter cutting the plurality of strips of the slit web of curled laminated material into segments to form curled decorative grass simulating Spanish moss in appearance.

2. The method of claim 1 wherein the first web of material is laminated to the second web of material with a bonding material tinted to simulate the color of Spanish moss.

3. A method for making curled decorative grass simulating Spanish moss comprising the steps of:

drawing a web of laminated material having a color substantially corresponding with the color of Spanish moss and capable of having a curl imparted thereto over at least one curl bar while maintaining the web of laminated material under tension so as to form a curled web of laminated material having a color substantially corresponding with the color of Spanish moss, the web of laminated material having a first web of material having a thickness in a range from about 0.1 mil to about 10 mil and a second web of material having a thickness in a range from about 0.1 mil to about 10 mil, the curl bar having a curling edge over which the web of laminated material is drawn to form the curled web of laminated material and wherein the curling edge of the curl bar is disposed at an angle of from about 15 degrees to about 180 degrees relative to the direction of travel of the web of laminated material and wherein the first web of material is polymeric film and the second web of material is paper;

slitting the curled web of laminated material to provide a slit web of laminated material containing a plurality of strips having a predetermined width; and cutting the slit web of laminated material to provide decorative curled grass simulating Spanish moss in appearance.

4. The method for making curled decorative grass simulating Spanish moss of claim 3 wherein the first web of material is laminated to the second web of material with a bonding material tinted to simulate the color of Spanish moss.

\* \* \* \* \*